United States Patent
Bial et al.

(10) Patent No.: US 11,976,754 B2
(45) Date of Patent: May 7, 2024

(54) FLANGE CONNECTION HAVING A WELD RING GASKET

(71) Applicant: KLINGER Kempchen GmbH, Oberhausen (DE)

(72) Inventors: Torsten Bial, Gelsenkirchen (DE); Clemens Seifert, Bielefeld (DE)

(73) Assignee: KLINGER Kempchen GmbH, Oberhausen (DE)

( * ) Notice: Subject to any disclaimer, the term of this patent is extended or adjusted under 35 U.S.C. 154(b) by 832 days.

(21) Appl. No.: 16/997,013

(22) Filed: Aug. 19, 2020

(65) Prior Publication Data

US 2021/0054953 A1 Feb. 25, 2021

(30) Foreign Application Priority Data

Aug. 20, 2019 (DE) ..................... 10 2019 122 355.5

(51) Int. Cl.
| | |
|---|---|
| F16L 13/00 | (2006.01) |
| F16L 13/06 | (2006.01) |
| F16L 23/16 | (2006.01) |
| B23K 26/242 | (2014.01) |
| F16L 51/00 | (2006.01) |

(52) U.S. Cl.
CPC .............. *F16L 13/06* (2013.01); *F16L 23/16* (2013.01); *B23K 26/242* (2015.10); *F16L 51/00* (2013.01)

(58) Field of Classification Search
CPC . F16L 13/06; F16L 23/16; F16L 51/00; F16L 23/20; F16L 23/032; B23K 26/242; F16J 15/025
See application file for complete search history.

(56) References Cited

U.S. PATENT DOCUMENTS

| | | | | |
|---|---|---|---|---|
| 6,394,507 B1 * | 5/2002 | Baker | ................ | F16L 23/0283 |
| | | | | 285/368 |
| 2017/0009918 A1 * | 1/2017 | Koves | ..................... | F16L 23/18 |
| 2018/0117718 A1 * | 5/2018 | Rajagopalan | ........ | B23K 9/0284 |

FOREIGN PATENT DOCUMENTS

| | | | | |
|---|---|---|---|---|
| CN | 103644407 A | * | 3/2014 | ............. F16J 15/46 |
| CN | 104089120 A | * | 10/2014 | ............ F16L 23/032 |
| CN | 106868425 B | * | 3/2018 | ............. B23K 9/164 |
| DE | 1 248 393 B | | 8/1967 | |
| DE | 35 40 344 A1 | | 5/1987 | |
| DE | 4407728 C1 | * | 3/1995 | ............... F16J 15/08 |
| GB | 846576 A | * | 8/1960 | |
| GB | 2525991 A | * | 11/2015 | ............. F16J 15/028 |
| GB | 2538323 A | * | 11/2016 | ............. F16L 17/08 |
| JP | 2013510463 A | * | 3/2013 | |
| WO | WO-2008145589 A1 | * | 12/2008 | ........... B65D 90/024 |
| WO | WO-2013005570 A1 | * | 1/2013 | .......... B23K 35/3053 |

* cited by examiner

*Primary Examiner* — Kiley S Stoner
(74) *Attorney, Agent, or Firm* — Collard & Roe, P.C.

(57) ABSTRACT

A flange connection has two flanges and a weld ring gasket arranged between the flanges, wherein the weld ring gasket has two weld ring halves arranged one on top of the other, each having a base section and a lip arranged on it, wherein the weld ring halves are welded to the base section by way of a fillet weld with the flange that lies against it, and wherein the lips form a torus-shaped connection section having a hollow interior, and the weld ring halves are welded to one another at the torus-shaped connection section, by way of a caulking seam. The torus-shaped connection section is arranged to lie radially on the inside.

14 Claims, 4 Drawing Sheets

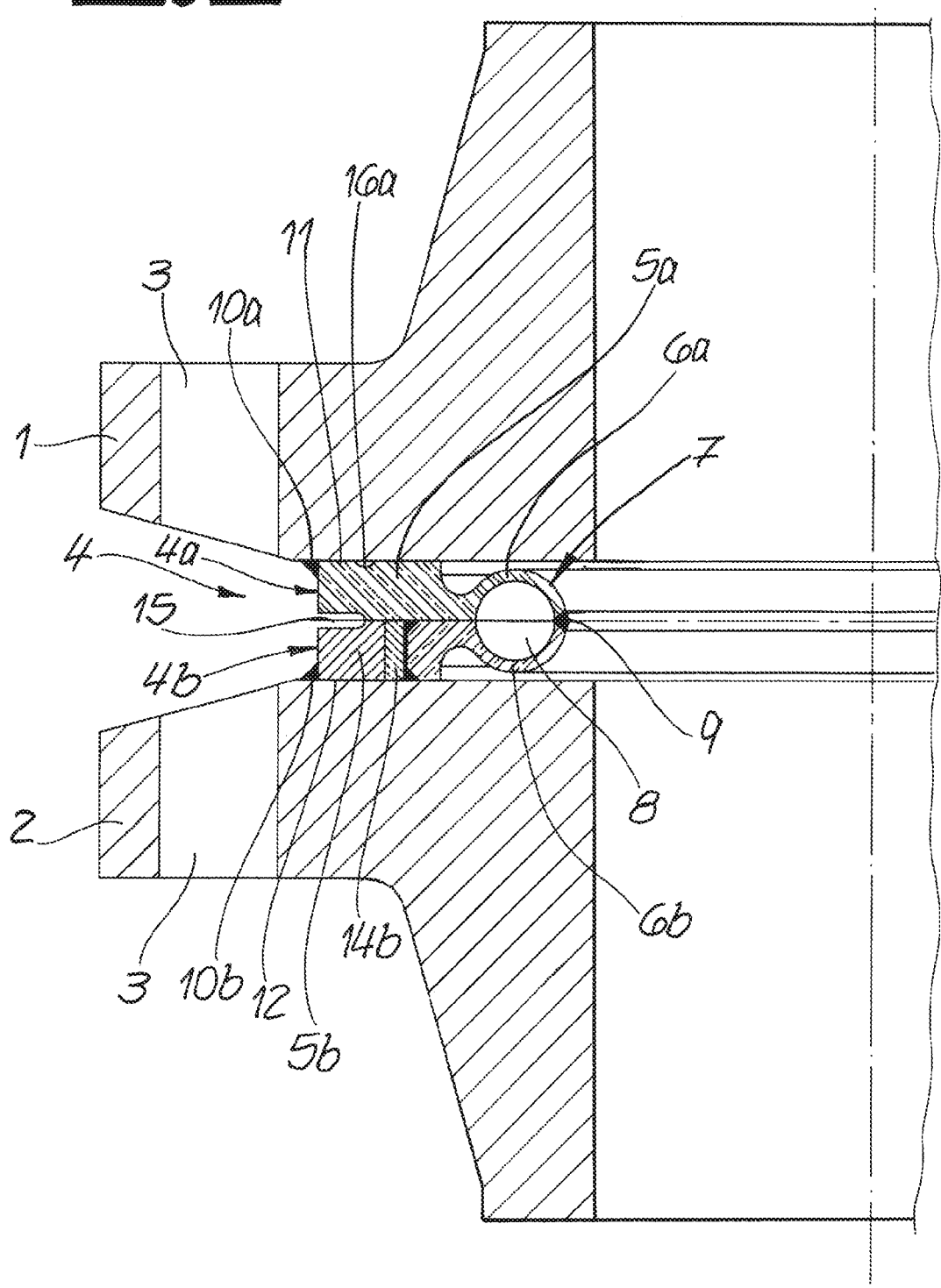

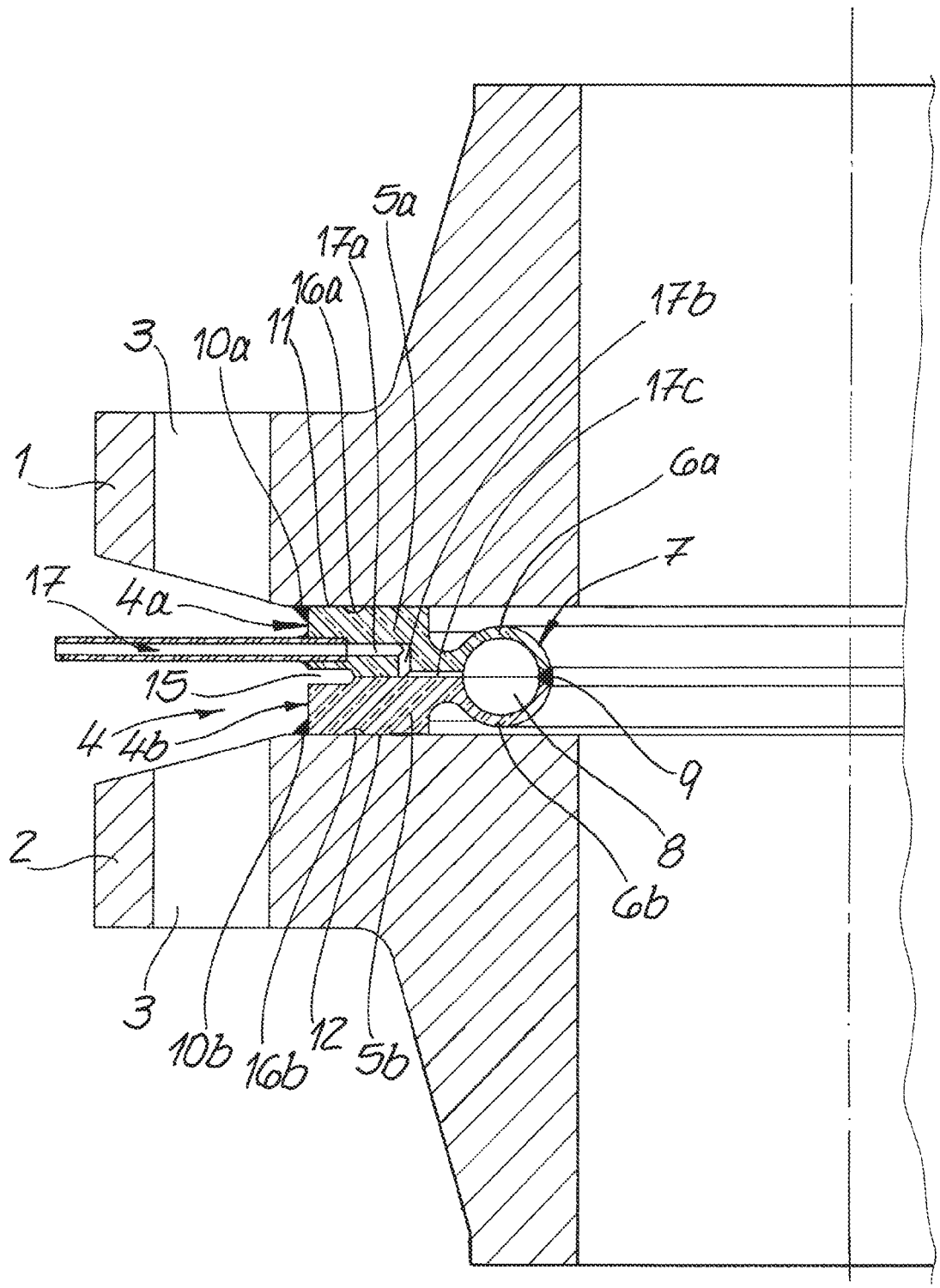

FLANGE CONNECTION HAVING A WELD RING GASKET

CROSS REFERENCE TO RELATED APPLICATIONS

Applicant claims priority under 35 U.S.C. § 119 of German Application No. 10 2019 122 355.5 filed Aug. 20, 2019, the disclosure of which is incorporated by reference.

BACKGROUND OF THE INVENTION

1. Field of the Invention

The present invention relates to a flange connection having two flanges and a weld ring gasket arranged between the flanges, wherein the weld ring gasket has two weld ring halves arranged one on top of the other, each having a base section and a lip arranged on it, wherein the weld ring halves are welded to the base section by way of a fillet weld with the flange that lies against it, and wherein the lips form a torus-shaped connection section having a hollow interior, and the weld ring halves are welded to one another at the torus-shaped connection section, by way of a caulking seam.

2. Description of the Related Art

Weld ring gaskets are gasket elements that are preferably used when particularly great demands are made on the required tightness. This situation is the case, for example, in process technology facilities in which hazardous or highly critical media are transported, which are under great pressure, for example, or have very high temperatures. In this regard, it must always be ensured that not even the slightest bypass streams can exit from the flange connection.

To guarantee such a high level of tightness, the individual weld ring halves are usually first welded to a sealing surface of a flange. This welding generally takes place by way of what is called a fillet weld, which has an essentially triangular shape in cross-section, and by way of which two surfaces that essentially stand perpendicular to one another are connected with one another. Accordingly, this fillet weld lies against both the flat sealing surface of a flange and against a radial outer surface of the base section.

Both the positioning of the weld ring halves and their fastening must take place in extremely precise manner, so that the weld ring halves are arranged without or with only very slight edge offset relative to one another during the course of bracing of the flange connection. In this connection, it is of decisive importance that the lips or the lip edges are positioned precisely relative to one another, because they are welded to one another in the next assembly step and form a torus-shaped connection section, wherein the quality of the weld seam is important for the tightness and thereby for the functionality of the weld ring gasket. The weld seam that connects the two weld halves at the lips is usually referred to as a caulking seam.

According to the usual embodiments, the base section and thereby also the fillet welds are arranged to lie radially on the inside, and the torus-shaped connection section is arranged to lie radially on the outside.

The torus-shaped connection section, however, not only has the task of connecting the two weld ring halves with one another, but also serves to absorb radial loads. Specifically in process-technology facilities, which bring about great dynamic stress on the flange, the weld ring gasket must be able to equalize radial displacements to a certain degree. By means of the torus-shaped configuration of the connection section with a cavity on the inside, this section can deform to a certain degree and thereby equalize the radial stresses. In this regard, the torus-shaped connection section can have either a circular or an oval shape in cross-section. Embodiments that deviate from a circular or oval embodiment, however, are also included within the scope of the invention.

An embodiment of the stated type is known, for example, from DE 3 540 344 A1. As has already been explained above, the individual weld ring halves are welded together by way of a fillet weld, with the adjacent flanges lying radially inward. The connection of the individual weld halves with one another takes place by way of a further circumferential caulking seam, which connects the weld lips with one another.

In the case of the weld ring gaskets that are already known, however, it is problematic that the tightness is decisively dependent on the caulking seam at the torus-shaped connection section. Even slightly incorrect positioning between the individual weld ring halves or defects in the caulking seam itself can lead to the result that the weld seam fails, in particular under the influence of dynamic stresses, and consequently a crack spreads within the caulking seam. Upon the formation of such a crack, however, the weld ring gasket can no longer fulfill a sealing function, so that the media transport within the pipeline can exit into the surroundings. Aside from safety-critical aspects, this inability to fulfill a sealing function also has the result that the process-technology facility must be temporarily shut down and the weld ring gasket must be replaced.

Against this background, the caulking seam must be welded with extreme care, wherein particular attention must be paid to ensure that what is called a root forms inside the hollow interior of the torus-shaped connection section, which root reliably connects the lips with one another, even from the inside out. The quality of the weld seam, however, cannot be checked subsequently, because the flanges are already firmly braced against one another and accordingly no sufficient construction space is available for such investigations.

At the same time, the medium to be transported can get into the hollow interior during operation, getting through between the base sections. These media can be corrosive, flammable, and/or toxic media, which furthermore are not only subject to great pressure but also can have a high temperature. This situation is particularly problematical, however, in that in the case of removal of the weld ring gasket or when opening up the caulking seam, it can be assumed that a significant hazard situation exists, in particular because prior cleaning of the torus-shaped connection section is not possible.

Usually, therefore, no full-scope opening up of the caulking seam takes place at first, but rather a relief bore is introduced. Even such a relief bore is connected with significant risk, however, because combustible media, for example, can ignite immediately, and this occurrence is always connected with the risk of personal injury, among other things. This situation holds true equally when corrosive or toxic chemicals exit from the cavity of the torus-shaped connection section.

In total, therefore, the weld ring gaskets that are already known require improvement, in particular with regard to user friendliness and ease of installation.

SUMMARY OF THE INVENTION

Against this background, it is an objected of the present invention to simplify the assembly of a weld ring gasket and reduce the susceptibility to errors during installation.

These and other objects are accomplished by means of a flange connection according to the invention. Accordingly, the torus-shaped connection section of the weld ring gasket is arranged to lie radially on the inside. This arrangement simultaneously also means that the base sections of the weld ring halves are arranged to lie radially on the outside.

Fundamentally, weld ring gaskets having a torus-shaped connection section that lies radially on the inside are known. Thus, for example, DE 1 248 393 A1 describes a weld ring gasket having two connection sections that are provided next to one another. Such an embodiment, however, also has the disadvantage that in the case of weld ring gaskets of the type described initially, the fillet welds are subject to great stress due to flange face rotation. According to DE 1 248 393 A1, a modified flange face geometry is therefore provided, by means of which fillet welds can be avoided. For a large number of flanges, however, such modification is not practical. In spite of the stresses, fastening of the weld ring halves to the flanges should therefore take place in the form of fillet welds, because the advantages of such an embodiment predominate.

Thus, in advantageous manner, the individual weld ring halves can first be welded to one another and only afterward welded to the flanges. This sequence has the advantage that the caulking seam, which is decisive for the sealing effect, can be welded between the lips, outside of the flange arrangement. Thus, it is possible, for example, to form these parts by machine, on the workshop side or also on the manufacturer's side, and thereby the required quality can be guaranteed with a greater degree of reliability. This advantage also holds true, however, even if the caulking seam is introduced not by machine but rather manually, because checking the quality is possible after formation of the caulking seam.

At the same time, the individual weld ring halves can be positioned precisely relative to one another even before introduction of the caulking seam, so that the risks of edge offset are slight.

Accordingly, connection of the weld ring halves with the flanges takes place only in a subsequent method step, wherein then, the fillet weld is introduced between the surfaces of the base section that lie radially on the outside and the sealing surfaces of the flanges that lie against them, which weld is arranged along the entire circumference, in each instance. It is true that in this regard, the disadvantage is accepted that the accessibility for the production of these fillet welds is clearly reduced in comparison with a weld ring gasket in which the individual weld ring halves are welded to the flange in a first assembly step. Nevertheless, it is significantly easier for the installer to produce fillet welds having sufficient quality than to produce the caulking seam by way of which the lips are welded to one another to form a torus-shaped connection section. In particular, a slight offset between the individual base sections can be ignored during production of the fillet weld, because such a weld is of secondary importance for attachment to the flange.

A further positive aspect of the present invention is that the torus-shaped connection section having the hollow interior does not stand in an active connection with the channel of the pipe connection, so that no medium can penetrate into the cavity. This aspect is particularly advantageous during disassembly of the weld ring gasket.

If the weld ring gasket needs to be replaced, no opening up of the torus-shaped connection section takes place, in contrast to previously known weld ring gaskets. Instead, the individual fillet welds on the base section are opened, so that the weld ring gasket can be removed. Because the weld ring gasket has much more material at the base section than at the lips, it is possible accordingly to work with less precision even when opening the weld seams.

Preferably, the weld ring halves lie against one another by way of a first contact surface of the base section, and at least one of the weld ring halves has a first contact surface having a setback that runs in the vertical direction, wherein a ring gap that is open radially outward forms between the weld ring halves. In this connection, a vertical direction is understood to be a direction that is arranged perpendicular to the contact surfaces.

Now bending of the base section to a certain extent is made possible by means of the ring gap. This bending is caused by the bracing forces of the fastening means by way of which the flanges are braced relative to one another. If such a ring gap were eliminated, and if bending were blocked, accordingly, the forces that occurred during bracing would have to be absorbed by the fillet welds, to a great extent. As a result, the risk of failure of the fillet welds would be significantly increased. By means of the introduction of such a ring gap, the flow of force is displaced inward or to a region of the base sections that lies on the inside, so that the force to be transferred by way of the fillet welds is reduced.

This displacement of the flow of force can furthermore be influenced in targeted manner, in that in addition to or instead of such a ring gap, which is open toward the outside, the first and/or the second weld ring half has a notch, which runs in the circumferential direction, on a second contact surface that lies opposite the first contact surface. Accordingly, this notch faces the sealing surface of the flange. Such a notch leads to the result that the effective cross-section of the base section is reduced, so that the flow of force must necessarily run through this defined region. The width, the depth, and the shape of this notch are guided by the required installation conditions. Although the notch preferably has a shape that is round or triangular in cross-section, the invention is not exclusively restricted to such shapes. Fundamentally, it is sufficient if such a notch is provided on only one weld ring half, but preferably, both weld ring halves have a corresponding notch in the second contact surface. The shape of the notch can be configured to be the same but also different in the case of the two weld ring halves.

Possible materials for the weld ring halves are, above all, austenitic chromium-nickel steels or nickel-based materials, because these materials demonstrate particularly good elongation at rupture. Elongation at rupture is a characteristic value of materials science, which characterizes the deformability of a material and indicates to what extent a material can be deformed until it breaks or until a crack forms in this material. The materials used within the scope of the invention preferably demonstrate an elongation to rupture of greater than 30%, in this regard. This requirement can be met with the austenitic chromium-nickel steels already mentioned or with nickel-based materials, among others.

In a further development of the invention, however, the weld ring halves are not formed in one piece from such a material. Instead, the base section of at least one of the weld ring halves is formed separately from the lip, wherein the base section and the lip are connected with one another by way of a cladding. This sequence has the advantage that different materials can be used for the lip, on the one hand, and the base section, on the other hand. This flexibility is practical because weld seams should preferably be formed between two components composed of the same or a similar material, because only in this way can it be guaranteed that they do not fail prematurely under tensile stress. Although a high-quality steel having a high elongation to rupture is used for the connection section, so as to be able to absorb the radial stresses, the flanges, however, are usually formed from a non-alloy or low-alloy steel. Accordingly, in the case of a one-part embodiment composed of chromium-nickel steel or a nickel-based material, the fillet weld would be formed between a high-alloy and a non-alloy or low-alloy steel.

In this regard, a non-alloy steel within the scope of the invention is understood to be a steel that has alloy components in a total amount of less than 1% by weight. A low-alloy steel accordingly has alloy components of more than 1% by weight but less than 5% by weight. If the proportion of alloy components lies at or above 5% by weight, one speaks of a high-alloy steel. In the case of the chromium-nickel steels already mentioned, and also in the case of the nickel-based materials, these steels are steels having a high alloy proportion.

In the case of such an embodiment, the base section is accordingly formed from a non-alloy or low-alloy ferritic carbon steel, and the lip is formed from austenitic chromium-nickel steel or from a nickel-based material.

Connection of the base section and the lip takes place—as has already been explained above—by way of a cladding. The cladding can be configured as a welded cladding or also as an explosive cladding. If the cladding is welded, this connection is a weld between two different materials, wherein such a weld is non-critical at the cladding, because the base sections and the adjacent lip are exclusively subject to pressure stress, not to tensile stress, because the high-alloy materials of the sealing lip demonstrate greater heat expansion than the low-alloy or non-alloy materials of the base sections. Because the connecting weld seams are therefore not subject to tensile stress, the risk of failure is also clearly reduced.

In a further development of the invention, the torus-shaped connection section is sheathed by a hood to protect it. In this regard, the hood can be formed both in one piece and by way of individual segments combined with one another. The hood has the task of protecting the torus-shaped connection section against mechanical damage. This protection is of particular importance if abrasive media are being transported through the flange connection. Likewise, in the case of apparatuses having a temperature-resistant lining, the hood is supposed to prevent casting concrete from flowing into the region around the torus and restricting the radial movement potential. The hood is preferably produced from sheet metal, for example from a chromium-nickel steel, and makes contact between the base sections and the sealing surfaces of the flanges that are assigned to the base sections. In this way, the hood is braced between the base sections and the flanges, and accordingly cannot come loose.

In a further development of the invention, at least one radial channel extends from the outside all the way to the hollow interior of the torus-shaped connection section. Such a radial channel can be implemented, for example, by means of a simple bore through a weld ring half. Alternatively, it is also possible that one of both weld ring halves have one or more notches in the first contact surface, which notches extend radially along the entire first contact surface. Furthermore, the two alternatives can also be combined with one another. Thus it is conceivable, for example, that a bore along a first radial section extends at least in part through one of the weld ring halves and then stands in an active connection with a notch in one or in both fastening sections of the weld ring halves, by way of a vertical channel section, wherein the hollow interior of the torus-shaped connection section can be reached by way of this third channel section. Such an embodiment is particularly practical if a ring gap that is open toward the outside is provided, by way of which gap the fillet welds can be relieved of stress. The first channel section or the bore by way of which the first channel section is implemented is configured, in such a case, in such a manner that it runs beyond the open ring gap, and the vertical second channel section makes a transition into the third channel section or into the third channel section that forms the notch only behind the ring gap.

Using such a channel, it is possible to flush the welding space with inert gases to thereby allow reliable protection of the root of the caulking seam. At the same time, pressure equalization between the hollow interior and the surroundings is also possible, so that no excess pressure can form in the torus-shaped connection section during the welding process.

In a preferred embodiment of the invention, at least four channels are provided, which are uniformly distributed along the circumference. In the case of four radial channels, these channels are consequently arranged at an angle of 90° relative to one another. A piping can be connected to the channels, which makes it possible to connect the channels with a flushing gas connector in simple manner.

An object of the invention is not only a flange connection, however, but also a weld ring gasket for a flange connection according to another aspect of the invention, a weld ring half for the formation of a weld ring gasket according to a further aspect of the invention, as well as a method for the formation of a flange connection according to an additional aspect of the invention.

In this regard, all of the characteristics mentioned in connection with the flange connection can also be transferred to the weld ring gasket, the weld ring half, as well as the method, to the extent that these are reflected in the individual objects.

The weld ring gasket according to the invention, for a flange connection according to the invention, is characterized in that the weld ring halves lie against one another by way of a first contact surface of the base section, and at least the first contact surface of one of the weld ring halves has a setback that runs in the vertical direction. A ring gap that is open radially outward forms between the weld ring halves, and at least one of the weld ring halves has a notch that runs in the circumference direction, on a second contact surface that lies opposite the first contact surface.

Both the notch and the ring gap that is open toward the outside serve for control and defined progression of the force lines. In this way, it is prevented that in a braced state of the weld ring gasket, the force lines run primarily through the fastening seams by way of which the weld ring gasket is connected with the related flange. Such a weld ring gasket is therefore particularly suitable if the weld ring gasket is connected with the flanges in usual manner, by way of a fillet weld as the fastening seam. Therefore, the weld ring gasket can be used in the case of usual flange geometries and does not require any design adaptation of the flange face geometry.

In order to achieve such targeted force management, the ring gap that is open radially outward extends, in the radial direction, over at least 20%, preferably over at least 30%, of the base section. The notch is preferably arranged at the end of the ring gap that is open outward, in the radial direction.

To form the flange connection according to the invention, the lips of the weld ring halves are first welded to one another by way of a caulking seam to form a torus-shaped connection section. Subsequently, the weld ring gasket is arranged between two flanges and braced to them, wherein the weld ring halves are then welded to a flange on a sealing surface, in each instance, by way of a fillet weld.

According to a further development of the method, the weld seam on the torus-shaped connection section, which is also referred to as a caulking seam, is investigated with regard to its quality before being placed between the flanges. By means of such an investigation, it can be checked whether the caulking seam has defects or if the weld seam does not connect the two lips with one another completely, for example at a few local locations, so that accordingly, an absolute seal cannot be guaranteed. Such an investigation preferably takes place in a laboratory setting or also directly at the installation site.

Preferably, the weld seam on the torus-shaped connection section is heat-treated before being placed between the flanges, to eliminate harmful stresses.

Furthermore, in the case of the method, the weld ring halves can be preheated before being welded to one another and/or before welding of the weld ring halves to the flanges. In this way, it is possible to already prevent mechanical stresses in advance, because the temperature differences between the weld seam and the weld ring gasket are minimized.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows an alternative flange connection according to FIG. 2, wherein a weld ring half is configured in one piece; and FIG. 4 shows an alternative flange connection having a radial channel.

DETAILED DESCRIPTION OF PREFERRED EMBODIMENTS

Figure 1:
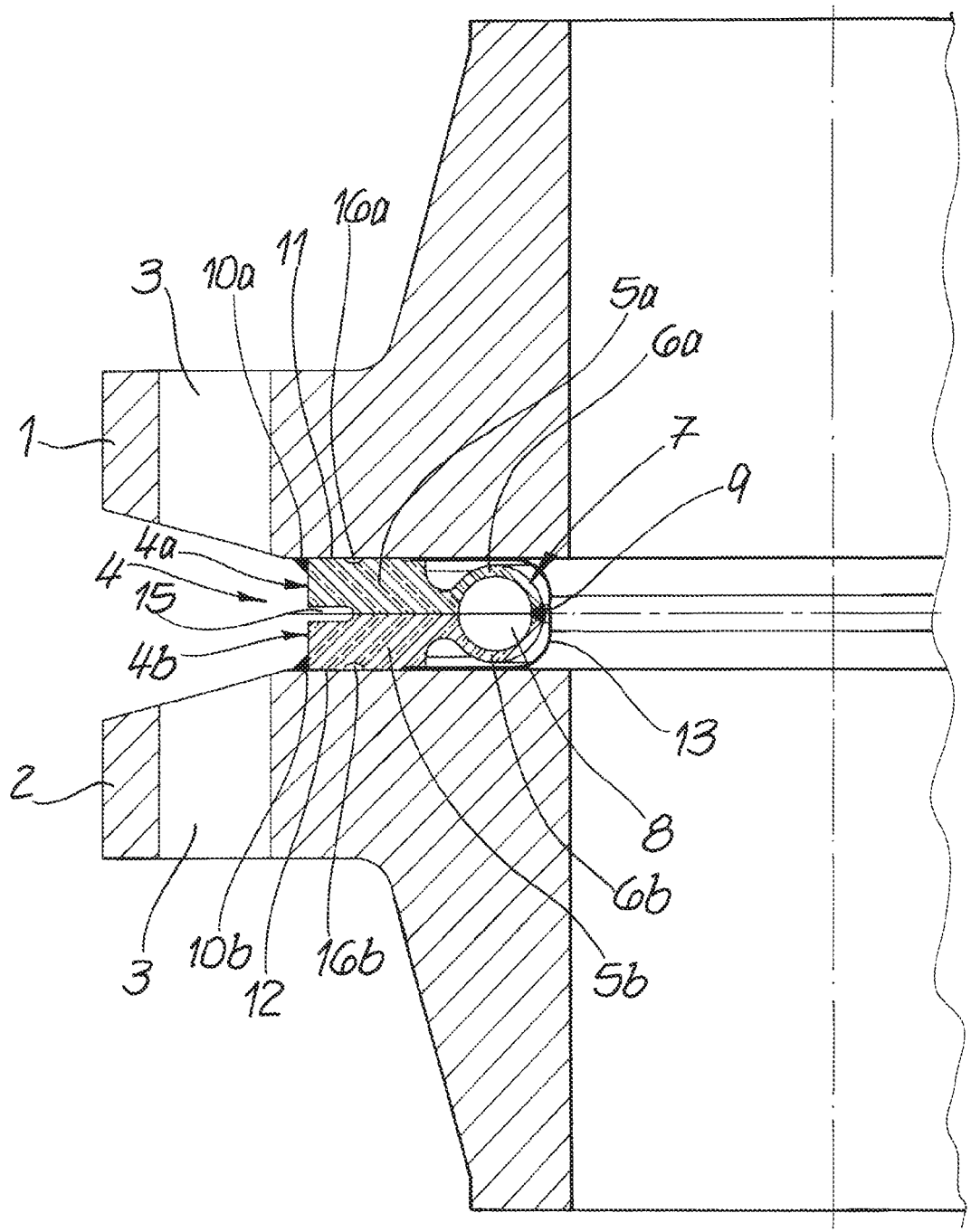
FIG. 1 shows a flange connection according to the invention, having a weld ring gasket and hood.

FIG. 1 shows a flange connection having a first flange 1 as well as a second flange 2. Both flanges 1, 2 have multiple bores 3, by way of which the flanges 1, 2 can be braced against one another. In this regard, the bores 3 serve as a holding means for usual fastening means, for example screw connections.

A weld ring gasket 4 is provided for sealing the flange connection, which gasket is arranged between the flanges 1, 2 and has two weld ring halves 4a, 4b, arranged one on top of the other. Each of these weld ring halves 4a, 4b consists of a base section 5a, 5b as well as of a lip 6a, 6b arranged on it. The lips 6a, 6b are arranged lying radially against the inside of the base sections 5a, 5b and form a torus-shaped connection section 7 having a hollow interior 8. For this purpose, the lips 6a, 6b have a semicircular shape in cross-section. A caulking seam 9 is provided for connecting the two lips 6a, 6b, by way of which seam the two lips 6a, 6b and consequently also the two weld ring halves 4a, 4b are welded to one another. The caulking seam 9 extends through the lips 6a, 6b and forms a rear-side root in the interior 8.

The weld ring halves 4a, 4b are fastened to sealing surfaces 11, 12 of the flanges 1, 2, lying radially on the outside, by way of the base sections 5a, 5b, wherein this fastening is implemented in the form of fillet welds 10a, 10b.

For protection of the torus-shaped connection section 7, a hood 13 is furthermore provided, which sheathes the torus-shaped connection section 7.

According to the exemplary embodiment of FIG. 1, the two weld ring halves 4a, 4b are configured in one piece and consist of an austenitic chromium-nickel steel or of a nickel-based material.

Because the weld ring halves 4a, 4b are connected with the flanges 1, 2 by way of a fillet weld 10a, 10b, in each instance, the fillet welds 10a, 10b are subject to great mechanical stress due to the bracing of the flanges 1, 2 relative to one another. To relieve the stress on these fillet welds 10a, 10b, a ring gap 15 that is open toward the outside is therefore provided, which is formed in that the weld ring halves 4a, 4b have a setback that runs in the vertical direction, on a first contact surface by way of which the weld ring halves 4a, 4b lie against one another. At the same time, the two weld ring halves 4a, 4b have a notch 16a, 16b that runs in the circumferential direction, on a second contact surface that lies opposite the first contact surface. The ring gap 15, which is open to the outside, allows bending of the weld ring halves 4a, 4b, to a certain extent, and thereby the flow of force is directed away from the fillet welds 10a, 10b. The same task is also accomplished by the notches 16a, 16b. By means of these measures, the sealing function of the fillet welds 10a, 10b can be guaranteed over a longer period of operation and, in particular, dynamic stresses can be better equalized.

Figure 2:
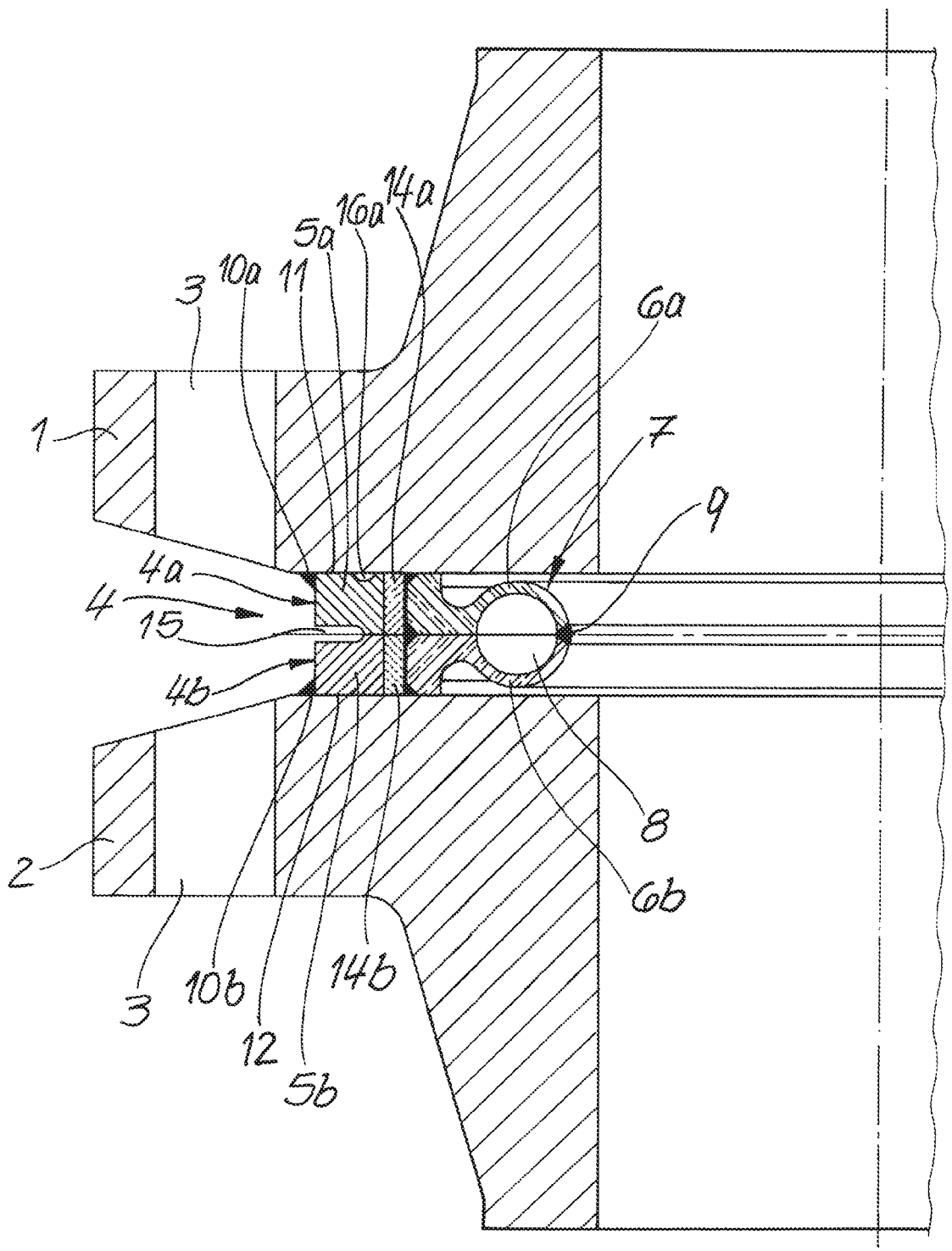
FIG. 2 shows an alternative flange connection having multi-part weld ring halves.

The embodiment according to FIG. 2 differs from the one in FIG. 1 to the effect that now, the weld ring halves 4a, 4b are configured in multiple parts. For this purpose, the base sections 5a, 5b are produced separately from the lips 6a, 6b and are connected with one another by way of a cladding 14a, 14b. By means of such a multi-part embodiment, it is possible that a material can be used for the base sections 5a, 5b that approximately corresponds to that of the flanges 1, 2. Usually, this material is non-alloy steel or low-alloy steel. In contrast, the lips 6a, 6b and, accordingly, the torus-shaped connection section 7 are formed from high-alloy steels, such as, for example, austenitic chromium-nickel steel or nickel-based materials, because these materials have a high elongation to rupture, for example greater than 30%, and thereby can equalize radial stresses very well. The advantage of this multi-part embodiment is that both the fillet welds 10a, 10b, which are usually also referred to as fastening seams, and the caulking seam 9 are always formed between components composed of the same or similar materials.

To connect the base sections 5a, 5b with the lips 6a, 6b, the lips 6a, 6b are welded to the cladding 14a, 14b. At this location, however, welding between materials that are not the same is not problematic, because the base sections 5a, 5b and the lips 6a, 6b are always subject to pressure stress.

Although both weld ring halves 5a, 5b are configured in multiple pieces according to FIG. 2, it also lies within the scope of the invention to configure only one of the weld ring halves 4b in multiple pieces and to configure the other weld ring half 4a in one piece. Such an embodiment is shown in FIG. 3.

Both according to the embodiment according to FIG. 2 and according to the embodiment of FIG. 3, only one notch 16a is implemented in the weld ring half 4a, whereas the weld ring half 4*b* is free of a notch 16*b*. Fundamentally, however, it is also possible for both weld ring halves 4*a*, 4*b* to have a notch 16*a*, 16*b*.

FIG. 4 shows an embodiment according to FIG. 1, but without a hood 13 that protects the torus-shaped connection section 7. In contrast to the weld ring gasket 4 according to FIG. 1, now multiple radial channels 17 are provided, by way of which a flushing gas can be introduced from the outside into the interior 8 of the torus-shaped connection section 7. For this purpose, the radial channel 17 has a first channel section 17*a*, which is shaped in the form of a bore in the first base section 5*a* of the first weld ring half 4*a*. A third channel section 17*c* is shaped in the form of a notch on the first contact surface of the weld ring half 4*a*, wherein the two channel sections 17*a*, 17*c* stand in connection with one another by way of a second channel section 17*b*, which runs in the vertical direction.

Although only a few embodiments of the present invention have been shown and described, it is to be understood that many changes and modifications may be made thereunto without departing from the spirit and scope of the invention.

What is claimed is:

1. A flange connection comprising:
(a) first and second flanges; and
(b) a weld ring gasket arranged between the first and second flanges and comprising a first weld ring half arranged on top of a second weld ring half;
wherein the first weld ring half comprises a first base section and a first lip arranged on the first base section and the second weld ring half comprises a second base section and a second lip arranged on top of the second base section;
wherein the first base section is welded to the first flange by way of a first fillet weld and the second base section is welded to the second flange by way of a second fillet;
wherein the first and second lips form a torus-shaped connection section having a hollow interior, and the first and second weld ring halves are welded to each other at the torus-shaped connection section by way of a caulking seam; and
wherein the torus-shaped connection section lies radially inside the first and second weld ring halves,
wherein each of the first and second base sections has a respective first contact surface that lie against each other;
wherein at least one of the first contact surfaces has a setback that extends in a vertical direction; and
wherein a ring gap that is open radially outward is formed between the first and second weld ring halves.

2. The flange connection according to claim 1, wherein at least one of the first and second weld ring halves has a notch extending in a circumferential direction, on a second contact surface that lies opposite the first contact surface of the at least one of the first and second weld ring halves.

3. The flange connection according to claim 1, wherein at least one of the first and second weld ring halves comprises an austenitic chromium-nickel steel or a nickel-based material.

4. The flange connection according to claim 1,
wherein the first base section is formed separately from the first lip, wherein the first base section and the first lip are connected with one another by way of a first cladding; or wherein the second base section is formed separately from the second lip, wherein the second base section and the second lip are connected with one another by way of a second cladding.

5. The flange connection according to claim 4, wherein at least one of the first and second base sections comprises a non-alloy or low-alloy ferritic carbon steel, and at least one of the first and second lips comprises austenitic chromium-nickel steel or a nickel-based material.

6. The flange connection according to claim 1, further comprising a hood that sheathes the torus-shaped connection section.

7. The flange connection according to claim 6, wherein the hood comprises a chromium-nickel steel.

8. The flange connection according to claim 1, wherein at least one radial channel extends from outside the flange connection to the hollow interior of the torus-shaped connection section.

9. A weld ring seal for the flange connection according to claim 1,
wherein the first contact surfaces lie against each other, and at least one of the first contact surfaces has a setback that extends in a vertical direction; and
wherein a ring gap that is open radially outward is formed between the first and second weld ring halves, and at least one of the first and second weld ring halves has a notch extending in a circumferential direction, on a second contact surface that lies opposite the first contact surface of the at least one of the first and second weld ring halves.

10. A weld ring half for forming the weld ring seal according to claim 9.

11. A method for forming the flange connection according to claim 1, comprising:
(a) connecting the first and second lips with each other by way of the caulking seam to form a torus-shaped connection section;
(b) arranging the weld ring gasket between first and second flanges and bracing the weld ring gasket against the first and second flanges; and
(c) welding the first weld ring half to the first flange on a first sealing surface by way of the first fillet weld and welding the second weld ring half to the second flange on a second sealing surface by way of the second fillet weld.

12. The method according to claim 11, further comprising inspecting the caulking seam on the torus-shaped connection section with regard to quality of the caulking seam before placing the caulking seam between the first and second flanges.

13. The method according to claim 11, further comprising heat-treating the caulking seam on the torus-shaped connection section before placing the weld ring gasket between the first and second flanges.

14. The method according to claim 11, further comprising preheating the first and second weld ring halves before at least one of:
welding the first and second weld ring halves to one another; and
welding the first and second weld ring halves to the first and second flanges, respectively.

\* \* \* \* \*